Figure 1:
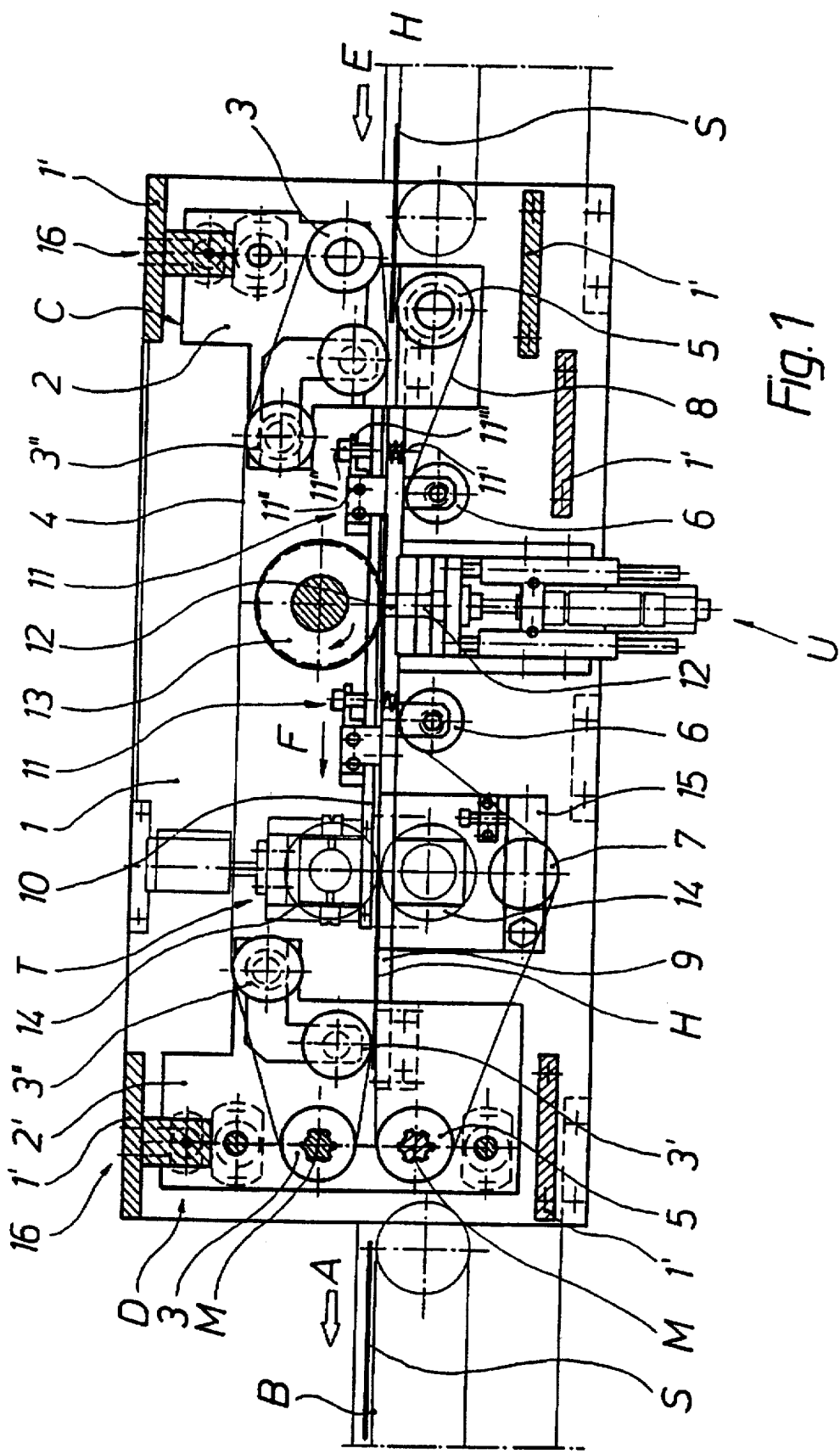

United States Patent [19]

Frey

[11] Patent Number: 5,672,236

[45] Date of Patent: Sep. 30, 1997

[54] DEVICE FOR PRODUCING SEPARATOR POCKETS FOR ELECTRICAL ACCUMULATOR PLATES

[75] Inventor: Helmut Frey, Ferlach, Austria

[73] Assignee: Jungfer Ges.mbH., Freistritz, Austria

[21] Appl. No.: 500,986

[22] PCT Filed: Jan. 21, 1994

[86] PCT No.: PCT/AT94/00004

§ 371 Date: Apr. 8, 1996

§ 102(e) Date: Apr. 8, 1996

[87] PCT Pub. No.: WO94/17984

PCT Pub. Date: Aug. 18, 1994

[30] Foreign Application Priority Data

Feb. 3, 1993 [AT] Austria ................. A 186/93

[51] Int. Cl.[6] ............................................. B32B 31/16
[52] U.S. Cl. .................. 156/510; 156/580.1; 156/583.5; 425/174.2
[58] Field of Search .......................... 156/510, 580, 156/580.1, 580.2, 583.1, 583.5; 425/174.2

[56] References Cited

U.S. PATENT DOCUMENTS

| 4,026,000 | 5/1977 | Anderson | 29/730 |
|---|---|---|---|
| 4,436,585 | 3/1984 | Moodie et al. | 156/73.1 |
| 4,605,454 | 8/1986 | Sayovitz et al. | 156/73.1 |
| 4,747,895 | 5/1988 | Wallerstein et al. | 156/73.3 |
| 4,866,914 | 9/1989 | Moribe | 53/479 |
| 5,591,298 | 1/1997 | Goodman et al. | 156/580.1 |

Primary Examiner—James Sells
Attorney, Agent, or Firm—m Karl Hormann

[57] ABSTRACT

Apparatus for making separator envelopes for electrical battery plates having a device for folding an ultrasonically weldable polymeric web around individual battery plates and a device for feeding filled separator envelopes to ultrasonic welding devices. The feed device being provided with two endless synchronously driven feed belts (4, 8) above and below a horizontal feed plane (H) for the separator envelopes (S) as well as symmetrically relative to a longitudinal center plane of the apparatus, which feed belts, with their loops extending parallel to the feed plane, together engage lateral portions of the separator envelopes and which continuously pull the superposed lateral margins of the separator envelopes protruding beyond the feed belts through the ultrasonic welding device.

10 Claims, 2 Drawing Sheets

DEVICE FOR PRODUCING SEPARATOR POCKETS FOR ELECTRICAL ACCUMULATOR PLATES

The invention relates to an apparatus for making separator envelopes for electrical battery plates, comprising a device for folding sections of an ultrasonically weldable polymeric web over individual battery plates and a device for feeding filled separator envelopes to ultrasonic welding devices where the superposed open side margins of the separator envelope are welded together.

In known apparatus for wrapping battery plates, the separator envelopes folded over individual battery plates and open at their sides are intermittently guided to an ultrasonic welding device consisting of a lower horn and an upper anvil. The lateral margins to be connected are pressed between the horn and the anvil, and the ultrasonic welding connection is produced by an ultrasonic impulse of predetermined energy and duration. The significant disadvantage of the known apparatus resides in its intermittent process cycle which requires an elaborate control and results in a relatively low production rate.

U.S. Pat. No. 4,026,000 also discloses an apparatus of the kind referred to supra, which operates continuously and thus allows a higher production rate. In the known apparatus, the horn cooperates with an oppositely positioned rotary anvil the bias pressure of which may be set by the force of a spring. Feeding of the laterally open separator envelopes is accomplished by a pair of superposed rollers which push the separator envelopes to be welded through the welding device proper. This construction suffers from the disadvantage that because of their push feeding into the welding zone, the side margins of the separator envelopes to be welded are subjected to strong stresses, and they are often damaged.

From U.S. Pat. No. 4,866,914 it is known per se in the field of welding open polymeric bags, to pull the open end of the bag through an ultrasonic horn arrangement with two endless feed belts engaging the bag on its upper and lower surfaces. The horn arrangement operates intermittently. Nothing is disclosed by this publication about the special problems of two-sided welding of envelopes and, more particularly, about any structural solution to the problem of adjustments to accommodate envelopes of different widths.

The invention is directed to providing an apparatus of the kind referred to supra which while carefully handling the separator envelopes, permits high production rates of separator envelopes of different widths welded on two sides. The apparatus in accordance with the invention is characterized by the fact that the feeding device comprises two endless synchronously driven feed belts respectively positioned above and below a horizontal feed plane for the separator envelopes, as well as in symmetry relative to a longitudinal center plane of the apparatus, and together engaging, with their loops extending parallel to the feed plane, lateral portions of the separator envelopes and continuously pulling superposed lateral margins of the separator envelopes protruding beyond the feed belts, through the ultrasonic welding devices, the upper and lower feed belts being respectively guided by pulleys in side plates of a machine frame positioned at the intake and output ends, the side plates of both sides of the machine frame being mounted in the machine frame for adjustment, by an adjustment device, of the width of the welding margin symmetrically relative to the longitudinal center plane of the apparatus.

By means of the apparatus in accordance with the invention the two superposed separator envelopes to be welded together can be pulled into and out of the ultrasonic welding devices by the feed belts. Since the upper and lower feed belts move in synchronism, the traction force is always constant. This, at a high production rate and little wear on the apparatus, permits as careful a manipulation as possible of the material to be welded. In this connection, the feed belt suspension in accordance with the invention allows the apparatus to be adjusted precisely to the welded lateral margins width of the separator envelopes to be welded.

In accordance with a preferred embodiment of the invention, the upper and lower feed belts are each guided by pulleys mounted on side plates at the input and output ends of the machine frame, with the side plates on both sides of the machine frame being maintained in the machine frame for adjustment by a calibration device for symmetrically adjusting the width of the welding margin relative to the longitudinal center plane of the apparatus.

An improved embodiment which makes for an exact guidance of the separator envelopes through the apparatus, is characterized by the provision, flush with each feed belt, of a hold-down rail located above a support affixed to the side plates and constituting the feed plane. In the feed direction, the hold-down rail extends forwardly and rearwardly of the ultrasonic welding device, and is mounted on the support resiliently biased toward it, with its basic distance from the support being adjustable.

For practical purposes one trimming device each for trimming the separator envelopes is provided behind the ultrasonic welding devices in the feed direction.

Figure 2:
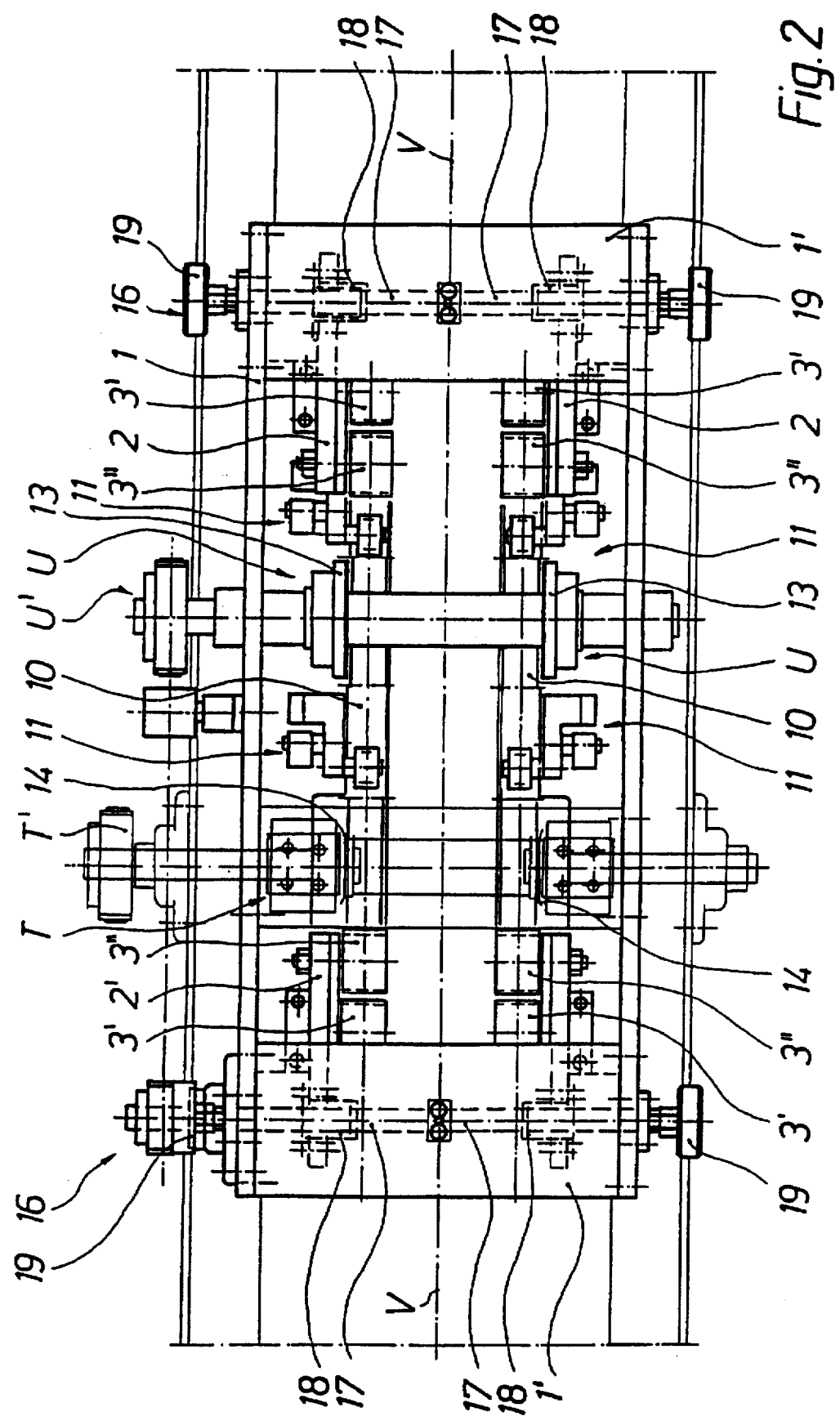

The invention and further characteristics thereof will hereinafter be explained in detail on the basis of an embodiment, with reference to the drawings, in which:

FIG. 1 shows a view in longitudinal section of an apparatus in accordance with the invention; and FIG. 2 is a plan view of FIG. 1.

The apparatus shown in the drawings has an input end (arrow E) for sequentially fed separator envelopes S, made, for instance, from a polyethylene foil, each folded around a battery plate and open at its sides and at its trailing end (the folding device and the device for feeding battery plates are not shown), and an output end (arrow A) for welded separator envelopes S.

The apparatus consists of two halves which are substantially symmetrical relative to a vertical center plane V. Side portions 1 of a machine frame supporting all essential components of the apparatus are connected to each other by a plurality of transverse struts 1'. Above a horizontal feed plane H and at the input and output ends, each side portion 1 supports a set C and a set D of three pulleys 3, 3', 3" each, journalled in side plates 2 and 2'. An endless upper feed belt, formed as a cogged belt 4 moving in the feed direction F of the separator envelopes S, is trained around the pulleys 3, 3', 3". The cogged pulley 3 of the set D at the output end is mounted on the drive shaft M of a motor (not shown).

Below the sets C and D, respectively, of cogged pulleys 3, 3', 3" at the input and output ends a lower cogged pulley 5 and 5' is mounted on each side plate 2 and 2', pulley 5' being also mounted on a drive shaft M. A lower feed belt which is a cogged belt 8 also is trained around the cogged pulleys as well as further cogged pulleys 6 and a tension roll 7 to be described. Together, the cogged belt 8 and the upper cogged belt 4 constitute a feed device engaging the lateral portions of the separator envelopes S to be welded. The two cogged belts 4, 8 are driven synchronously by the cogged pulleys 3, 5' and exert on the separator envelopes to be welded an always constant traction force.

A horizontal support 9 supporting a hold-down rail 10 for the lateral portions of the separator envelopes S and forming the feed plane H for the separator envelopes S, is mounted on the side plates 2, 2' at each side of the machine frame. The hold-down rail is resiliently biased against the support 9 by two spring bias mechanisms 11. The lower loop of the upper cogged belt 4 is running below the hold-down rail 10. The hold-down rail 10 is positioned flush relative to the cogged pulleys 3, 3', 3" and serves to maintain the engagement between the lateral portions of the separator envelopes S grasped between the cogged belts 4, 8 at a predetermined pressure set by the springs of the biasing mechanism 11. The margins of the separator envelopes to be welded together and protruding beyond the hold-down rail 10 are drawn through ultrasonic welding device U positioned laterally at each side of the machine frame and outside the hold-down rail 10.. The ultrasonic welding device comprises a vertical lower horn 12 and an upper anvil 13 cooperating therewith, the anvil 13 being a continuously rotating circular disc rotatably mounted on a common axle with the other anvil of the side portions 1 and driven by a drive U'. In the direction forwardly of and behind the welding device U, the support 10, at its lower surface supports the two cogged pulleys 6 guiding the lower loop of the cogged belt 8.

Each of the spring bias mechanisms 11 of the hold-down rail 10 comprises a rocker arm 11''', biased downwardly by a spring 11' and is pivotable about a pin 11", the bias of the spring 11' being adjustable by a screw 11$^{iv}$.

As they consecutively enter the input end E, the separator envelopes S, each loaded with a battery plate, are continuously drawn under the two parallel hold-down rails 10 by the pairs of cogged belts 4, 8. The hold-down rails 10 are thus slightly lifted against their spring bias and exert their preset bias against the lateral portions of the separator envelopes S. The separator envelopes S move through the continuously operating ultrasonic welding devices U. Before entering under the set D of cogged pulleys at the output end A, the welded separator envelopes S, for trimming of their welded lateral margins, move through margin trimming devices T each of which comprises a pair of upper and lower cutting discs 14 mounted on an axle journalled in the side portions 1 and driven by a drive unit T'. After leaving the apparatus, the separator envelopes S, now closed at three sides, are received by an output conveyor B.

In the vicinity of each margin trimming device the tension roll 7 is mounted on a support 15 connected to the associated support 8.

The side plates 2, 2' of the machine frame 1, 1', in which the cogged pulleys are journalled, are symmetrically adjustable relative to the longitudinal center plane of the apparatus and to each other. To this end, there is provided a lateral adjustment device 16 including two spindles 17 with opposing threads engaging nuts 18 attached to the side plates 2, 2', each being actuable by hand wheels 19 for adjusting the side plate 2, 2', including the components supported by them, in particular the cogged belts 4, 8, to accommodate the width of the apparatus to conform exactly to the width of the separator envelopes S to be welded together.

As shown in FIG. 1, the cogged pulleys 3', 3" are suspended floatingly relative to the side plates 2, 2' about the axis of the upper cogged pulley 3", by an angle iron, to simplify input and output of the separator envelope.

The welding gap of the ultrasonic welding devices U may be set by vertical adjustment of the horns 12.

It will be understood that within the ambit of the general inventive concept the described embodiment may be altered in different ways.

What is claimed is:

1. An apparatus for making separator envelopes for electrical battery plates, comprising:

machine frame means comprising substantially planar feed path means having an input end and an output end;

ultrasonic welding means positioned on said feed path means intermediate said input and output ends for ultrasonically welding to each other superposed opposite margins of polymeric web means individually folded over a plurality of battery plates;

means for continuously feeding said folded web means with said battery plates therebetween along said feed path with said opposite margins aligned in parallel therewith through said ultrasonic welding means, said feeding means comprising:

first and second pairs of endless belt means extending between said input and output ends and positioned in parallel to each other on opposite sides of said feed path, one of said belt means of each of said first and second pairs being positioned above and the other of said belt means of said first and second pairs being positioned below said feed path;

means for aligning said first and second pairs of endless belt means with said opposite margins of folded web means; and means for driving said endless belt means in synchronism.

2. The apparatus of claim 1, wherein said endless belt means is trained around pulley means suspended by side plate means respectively positioned at said input and output ends on opposite sides of said feed path means.

3. The apparatus of claim 2, wherein at least one of said pulley means at one of said input and output ends comprises a plurality of pulleys at least one of which is floatingly suspended.

4. The apparatus of claim 3, further comprising pulley means on opposite sides of, and adjacent, said welding means as seen in the direction of feed.

5. The apparatus of claim 4, wherein at least one of said one and said other endless belt means is provided with tension means.

6. The apparatus of claim 2, wherein said means for aligning said endless belt means with said opposite margins comprises selectively rotatable spindle means having oppositely threaded end sections positioned symmetrically and normal to the longitudinal axis of the machine frame means and received in complementary threaded means in said side plates at said input and output ends.

7. The apparatus of claim 1, wherein said feed path means comprises substantially horizontal support means provided with hold-down rail means extending parallel to each other on opposite side of said feed path means aligned with said opposite margins and resiliently biased thereagainst.

8. The apparatus of claim 7, wherein said hold-down rail means is mounted substantially flush with the endless belt means above said feed path means.

9. The apparatus of claim 8, wherein said hold-down rail means and said endless belt means extends forwardly and rearwardly of said ultrasonic welding means.

10. The apparatus of claim 1, further comprising, behind said ultrasonic welding means as seen in the direction of feed, means for trimming said opposite margins.

* * * * *